No. 759,132. PATENTED MAY 3, 1904.
F. SCHINBECKLER.
LAND ROLLER AND PULVERIZER.
APPLICATION FILED JUNE 7, 1901.
NO MODEL.
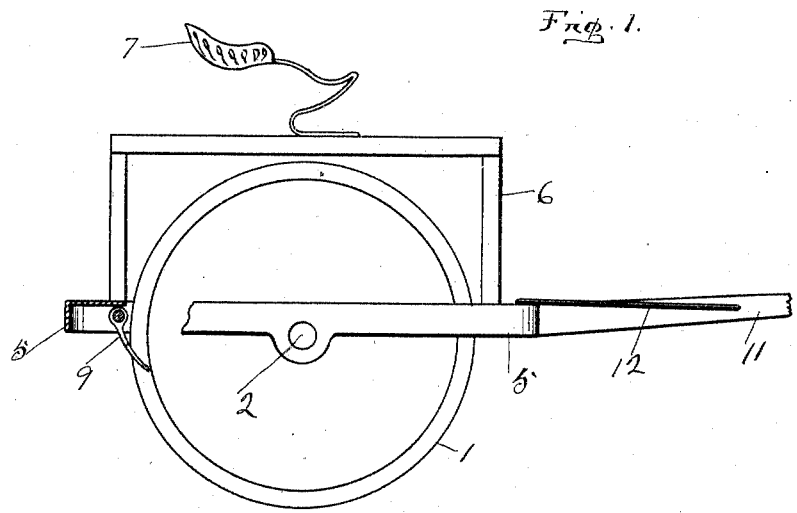
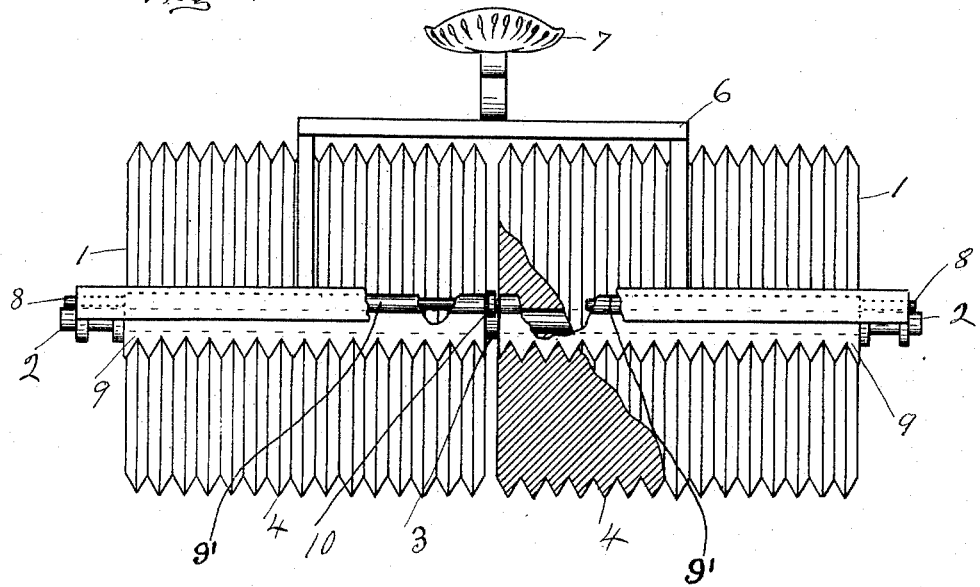
WITNESSES: Fredrick Schinbeckler INVENTOR
Adelaide Kearns.
Augusta Viberg. BY Chapin & Denny
His ATTORNEYS.

No. 759,132.

Patented May 3, 1904.

UNITED STATES PATENT OFFICE.

FREDRICK SCHINBECKLER, OF COLUMBIA CITY, INDIANA.

LAND ROLLER AND PULVERIZER.

SPECIFICATION forming part of Letters Patent No. 759,132, dated May 3, 1904.

Application filed June 7, 1901. Serial No. 63,526. (No model.)

*To all whom it may concern:*

Be it known that I, FREDRICK SCHINBECKLER, a citizen of the United States, residing at Columbia City, in the county of Whitley, in the State of Indiana, have invented certain new and useful Improvements in Land Rollers and Pulverizers; and I do hereby declare that the following is a full, clear, and exact description of the invention, which will enable others skilled in the art to which it appertains to make and use the same, reference being had to the accompanying drawings, which form part of this specification.

My invention relates to improvements in land rollers and pulverizers.

It is well known that the two essential functions of land-rollers are to break up, mash, and pulverize the clods and to roll down, even up, and pack the soil to properly prepare the ground for seeding. It is also well known that in the use of such a roller on clay land the soil when damp or wet will adhere in large masses to the perimeter of the roller and seriously clog the same.

The object of my present invention is to provide an improved pulverizing land-roller of simple and economical construction which is not only adapted to cut, break, and pulverize clods in the preparation of the ground for seeding and also to break and pulverize the thin crust, which frequently impedes the growth of young corn in starting, without injury to the young stalks, but which is also provided with a self-cleaning attachment mounted on the roller in coöperative relation with the perimeter thereof.

My invention consists of a plurality of roller-sections loosely mounted on a common axis in such relation as to form a continuous roller and having the perimeter thereof provided with a uniform series of knife-edged circumferential corrugations, a surmounted frame having a draft-tongue and a driver's seat, and a sectional self-cleaning attachment rigidly mounted on said frame and provided with a coöperating serrated working face.

Similar reference-numerals indicate like parts throughout the accompanying drawings, in which—

Figure 1 is a view in elevation of my improvement, broken away in part to show the relative arrangement of the self-cleaning attachment. Fig. 2 is a rear view of the same, also broken away in part, showing the means for mounting the cleaner attachment and the means for separating both the roller-sections and the cleaner-sections.

My improved roller, of any desired material, weight, and size, is formed of a plurality of roller-sections 1, preferably two in number, identical in construction and loosely mounted on a common horizontal shaft 2, provided at or near the middle of its length with a fixed collar 3 for slightly separating the adjacent ends of the roller-sections, as shown in Fig. 2. The perimeter of these roller-sections is provided with knife-edged circumferential corrugations 4, adapted to cut and materially aid in pulverizing the clods. These roller-sections are preferably solid, as shown in Fig. 2, though they may be made hollow with a proper hub and spoke construction, if desired. On the opposite protruding ends of the said shaft 2 is pivotally mounted any proper main frame 5, having a fixed upright portion 6, carrying a driver's seat 7.

In the rear portion of the frame 5 is rigidly mounted the horizontal shaft 8, on which is fixed my improved sectional cleaning attachment 9, which is slightly curved laterally in contour and is provided upon its lower edge with a uniform series of serrations of proper proportions and relative arrangement to engage such soil accumulations as may lodge between the peripheral corrugations of the said rollers, and thereby remove the same. Each of the sections 9 is also provided at its upper edge with a longitudinally-extending bearing-sleeve 9', said sleeves receiving the shaft 8, and thereby holding the sections to said shaft, and each of said sections is also of the same length as each roller-section 1. The sections of the said cleaner are so fixed relative to the periphery of the respective roller-sections that the serrations 4 thereof project into the spaces between the said corrugations without at any time forming a frictional contact with the rollers.

The cleaner-sections 9 are secured against any danger of lateral derangement by means of a fixed collar 10 on the shaft 8 intermediate of the said cleaner-sections. It will be observed, however, that the collar 10 of the shaft 8 is in alinement with and directly opposite to the collar 3, carried by the shaft or axis 2, and by reason of this construction it is obvious that as the sections of the roller 1 are always maintained separated by the collar 3, and hence incapable of sliding along the shaft or axis 2, the cleaner-sections 9 are also held separated and also incapable of sliding along the shaft 8, and the serrated teeth of the cleaner-sections are thus prevented at all times from frictional engagement with the serrated portions of the roller-sections. Consequently the wear upon the cleaner-teeth incident to such frictional engagement is entirely eliminated.

The frame 5 has a proper draft-tongue 11, provided with proper diagonal brace-rods 12 on each side thereof of well-understood arrangement.

The operation and manner of employing my improvement are manifest and briefly stated are as follows: The sharp-edged corrugations 4 will not only materially aid in cutting and pulverizing the clods, but will also break up into fine particles a thin hard crust of soil, which is often found covering a corn-field, particularly in a clay soil, without injury to the young sprouting corn. Whatever wet and sticky soil adheres to the corrugated perimeter of the roller in use will be promptly and readily removed by the serrated cleaner-bar before the said soil is carried quite a quarter of a revolution and without any appreciable friction.

As the roller-sections 1 are independently revoluble upon the shaft 2, one roller-section is permitted to revolve faster than the other section in turning around at each side of the field, thereby avoiding the dragging of one end of the roller when the same is formed in one piece.

Having thus described my invention, what I desire to secure by Letters Patent is—

In a combined land-roller and pulverizer, the combination with the frame thereof, of a roller formed of sections the periphery of each of which is corrugated, a shaft carried by said frame and upon which said sections are rotatably mounted, a collar carried by said shaft and interposed between said sections to maintain the same separated from each other and prevent the sections sliding upon said shaft, a second shaft arranged at the under side of said frame and inclosed by the latter, said second shaft being in parallel relation to the shaft of the roller-sections, a cleaner-section mounted upon said second shaft and directly opposite to each of said roller-sections, each of said cleaner-sections being of a length corresponding to the length of the roller-section opposite to which the same is placed, and having at its upper edge a longitudinally-extending bearing-sleeve which receives said second shaft, whereby said cleaner-sections are held to said shaft, said cleaner-sections being also provided with teeth fitting within the corrugations of the roller-sections and maintained from frictional engagement therewith, and a collar carried by the second shaft and interposed between the cleaner-sections, said collar being in alinement with and directly opposite to the collar carried by the shaft of the roller-sections, whereby the cleaner-sections are held separated and prevented sliding longitudinally upon their shaft, and thereby maintained in coincident relation with the roller-sections so that the teeth of the cleaner-sections are free from frictional engagement with the corrugated surfaces of the roller-sections.

Signed by me at Columbia City, Whitley county, State of Indiana, this 5th day of June, 1901.

FREDRICK SCHINBECKLER.

Witnesses:
THOS. R. MARSHALL,
P. H. CLUGSTON.